United States Patent [19]

d'Aprigny et al.

[11] Patent Number: 5,114,729
[45] Date of Patent: May 19, 1992

[54] METHOD OF MAKING A NEW DAIRY-BASED FOOD PRODUCT FROM A MILK ULTRAFILTRATION RETENTATE

[75] Inventors: Philippe D. d'Aprigny; Jean H. Le Treut, both of Saint Lo, France

[73] Assignee: Union Laitiere Normande, Sur-Vire, France

[21] Appl. No.: 426,738

[22] Filed: Oct. 24, 1989

[30] Foreign Application Priority Data

Oct. 24, 1988 [FR] France ................................ 88 13899

[51] Int. Cl.$^5$ ............................................. A23C 9/142
[52] U.S. Cl. ................................... 426/580; 426/491; 426/522
[58] Field of Search ................. 426/580, 491, 522

[56] References Cited

U.S. PATENT DOCUMENTS

| | | | |
|---|---|---|---|
| 4,051,269 | 9/1977 | Strinning | 426/603 |
| 4,205,090 | 5/1980 | Maubois et al. | 426/491 |
| 4,251,562 | 2/1981 | LeGrand et al. | 426/573 |
| 4,355,048 | 10/1982 | Schaap et al. | 426/91 |
| 4,497,834 | 2/1985 | Barta | 426/42 |

FOREIGN PATENT DOCUMENTS

| | | |
|---|---|---|
| 0165105 | 12/1985 | European Pat. Off. |
| 3710152 | 10/1988 | Fed. Rep. of Germany |
| 2052121 | 9/1971 | France |
| 2461461 | 6/1981 | France |
| 2587174 | 3/1987 | France |
| 1286403 | 8/1972 | United Kingdom |
| 2035330 | 6/1980 | United Kingdom |

OTHER PUBLICATIONS

Technology Abstract, "Method for Production of a Pasty Milk Product", Quest Accession No.: 83040709, Volkova, L. G., Soviet Union.

Primary Examiner—Donald E. Czaja
Assistant Examiner—Helen Pratt
Attorney, Agent, or Firm—Weingarten, Schurgin, Gagnebin & Hayes

[57] ABSTRACT

The present invention relates to a method of making a new food product, based on a milk-ultrafiltration retentate.

Said method consists mainly in a first milk concentration step by ultrafiltration and a second step of thermocoagulation of the obtained ultrafiltration retentate.

The resulting products—of terrine type—constitute another object of the invention.

25 Claims, No Drawings

METHOD OF MAKING A NEW DAIRY-BASED FOOD PRODUCT FROM A MILK ULTRAFILTRATION RETENTATE

FIELD OF THE INVENTION

The present invention relates to a method of making a dairy-based food product from a milk-ultrafiltration retentate.

The product obtained with said method is new and constitutes, per se, another object of the invention.

BACKGROUND OF THE INVENTION

For many years now, the techniques of ultrafiltration have been used in the milk and cheese industries.

French Patent 2 052 121, for example, describes a method which leads, through milk-ultrafiltration, to a concentrate of proteins—liquid pre-cheese—which is destined to the preparation of cheese, by addition therein of appropriate substances (rennet, lactic yeast, salt . . . ). French Patent 2 461 461 also describes the preparation of cheese from a swollen ultrafitration retentate, said preparation further involving the use of rennet. And it is also possible to prepare certain types of cheese—known as processed cheese—by adding processing salts to the ultrafiltration retentate.

French Patent 2 587 174 describes another use of the milk concentrate obtained by ultrafiltration. Sugar is added to it, and by heating the mixture, a food product is obtained which is known under the name of "milk jam".

Another patent, namely U.S. Pat. No. 4,497,834, also describes a method for preparing a food product—of spreading paste type—from milk. This method is based on a milk-concentration step by evaporation in vacuo, and on the baking of the resulting milk concentrate. To prevent graininess in the final product which is due to crystallization of lactose, the concentration of said product into said lactose has to be reduced, in the course of the method. The delactosing operation is advantageously carried out on the milk by enzymatic hydrolysis (lactase), by ultrafiltration or molecular sieving or by dilution.

FIELD OF THE INVENTION

The object of the invention is to propose a new use of the milk concentrate obtained by ultrafiltration, a new method of developing new food products of terrine type, from milk of animal origin.

The method according to the invention comprises two main steps (or consists essentially of).

The first step consists in concentrating, by ultrafiltration, milk of animal origin; this concentration being optionally combined with a diafiltration. The second step consists in heat-treating, at a maximum temperature of 100° C., the ultrafiltration retentate obtained at the end of the first step. Said retentate contains the natural proteins from the original milk. Under the effect of heat, said retentate—and in particular its proteins—coagulates. Depending on the intensity and duration of the heat treatment, said coagulation is more or less strong. Optionally, and also advantageously, the method according to the invention includes a third step which consists in adding one or more ingredients of edible nature to said ultrafiltration retentate, before and/or during and/or after said heat treatment. The ingredient or ingredients must be added in conditions such that they do not affect or alter the thermocoagulation of said retentate.

In other words, said ingredients should, in particular, be selected and added in such quantities and in such a medium that they cannot affect the phenomenon of coagulation of the retentate induced by the heat.

The first step of the method according to the invention consists in obtaining a milk-ultrafiltration retentate, and more specifically in concentrating milk of animal origin by ultrafiltration. This concentration step is known of anyone skilled in the art. It is, in the case of the present invention, carried out with whole or skimmed milk, advantageously standardized to a certain fat content. The object of this concentration step, according to the invention, is to obtain a more or less concentrated retentate; the desired volume concentration factor is advantageously between 4 and 7, this last value being preferred. It is nevertheless possible to obtain products according to the invention, by inducing the thermocoagulation of less concentrated ultrafiltration retentates. For example, it is quite possible, according to the invention, to induce the thermocoagulation of ultrafiltration retentates whose volume concentration factor is only 2 or 3. Advantageously, in this case, emulsifying, thicknening or gelling agents are added for texturing purposes. The volume concentration factor of the ultrafiltration retentate is one of the parameters permitting a modification of the consistency of the final product. Advantageously, the second step of the method according to the invention is carried out with an ultrafiltration retentate containing between 200 and 450 g/kg of dry matter.

As indicated hereinabove, this concentration step by ultrafiltration can optionally be combined with a diafiltration. The ultrafiltration retentate which is then obtained is partly delactosed. This delactosing operation is carried out, according to the invention, continuously and in parallel to the step of concentration by ultrafiltration.

This technique simplifies the technology and prevents the need of using other punctual delactosing methods.

In principle, this technique requires at least two ultrafiltration modules and between them, the ultrafiltration retentate is re-diluted with water. The quantity of eliminated lactose is, evidently, proportional to the quantity of added water and to the concentration factor of the retentate treated on the first module.

Its use in the method according to the invention is not in any way an obligation. It is possible, according to the invention, to obtain without any particular difficulties, consumable products with ultrafiltration retentates having a lactose content of 42–44 g/l. Such products have a characteristic texture. Indeed, the invention shows that the texture, the consistency and the aspect of the final products—thermocoagulated retentates—dies vary with the lactose content in the retentate to be coagulated.

It is thereafter specified that the ultrafiltration retentate obtained contains the natural proteins of the original milk and that, according to the invention, said proteins can only be transformed—physico-chemical modification—under the effect of heat. There is no interaction occurring, throughout the heat treatment, with any other substances contained in the ultrafiltration retentate.

Said heat treatment constitutes the second step in the method according to the invention. It induces, at least partly, the thermocoagulation of the ultrafiltration retentate obtained at the end of the first step of said method. Said heat treatment must be carried out at a temperature less than or equal to 100° C. An excessive temperature would give products which are uninteresting, unstable, of mealy texture.

Advantageously, and if necessary, the pH of the ultrafiltration retentate is adjusted between the ultrafiltration and the heat treatment to between 6 and 7, preferably between 6.3 and 6.7.

Said pH should not be too low as this would cause a two-phased separation of the medium.

The value of said pH is adjusted with a view to optimizing the texture of the final product.

Generally, to this effect, a small quantity of lactic yeasts are added to the ultrafiltration retentate and allowed to react for 30 minutes to 2 hours.

As indicated hereinabove, the heat treatment may be used so as to induce partial coagulation of the retentate. Pasty type products are then obtained which could be called "pre-terrine" products as opposed to the more compact products called "terrine" products which are obtained after a coagulation at higher temperature and/or longer contact period. Such "pre-terrine" products, which may optionally contain a stiffing, can be placed directly on the market. Before being eaten, they will be advantageously baked.

The thermocoagulation of the ultrafiltration retentate is induced by heating said retentate.

Said heating may consist in a discontinuous heating, batch or continuous heating.

According to a variant of the invention, the ultrafiltration retentate, with optionally incorporated ingredients, is poured into a mold and placed in an oven.

According to other variants, said retentate may be baked in a more sophisticated way, for example by extrusion-baking or in vacuo.

The heating temperature programme may be very varied. Said heating may be carried out in successive stages.

By way of indication, the heating is generally carried out at a temperature ranging between 60° and 100° C., for 1 to 8 hours, when complete thermocoagulation of the retentate is desired.

Mostly, a longer heating at a lower temperature is preferred. The product obtained then gaining in flavor.

For example, a retentate can be heated to about 70° C. for about 7 hours, and a firm terrine is obtained.

In certain cases, however, a quick heating at very high temperature is required, for example to obtain a "long life" type product.

Modulation of the heating parameters—time, temperature—is within the scope of anyone skilled in the art, depending on the type of products that he is required to prepare.

After heating, the ultrafiltration retentate is allowed to cool to room temperature and even below that.

Flocculation of the proteins ends during said cooling.

A strong cooling down may be required to prevent any contamination of the product by germs.

The third step of the method according to the invention, is, as already indicated, optional. It is indeed possible to obtain products which are interesting per se as nutrient substances, from a "pure" ultrafiltration retentate. Such products are of the "neutral terrine" type. Such terrines, however, can also be obtained by coagulation of an ultrafiltration retentate in which only texturing agents—emulsifiers, thickeners, gelling agents—have been incorporated, such as for example proteins or polysaccharides.

In an advantageous variant of the method according to the invention, at least one ingredient of edible nature is added. The incorporation of substance(s) in the retentate can obviously take place after the heat treatment of the latter. Advantageously, the substances are incorporated before and/or during said treatment. Terrines containing said substances are then obtained, the base of which is constituted of the thermocoagulated ultrafiltration retentate.

It is possible, before the thermocoagulation, in order to reduce the calory content of the final product, to add vegetable-type fibers or other constituent authorized by the legislation, as well as fat substitutes according to techniques wellknown in the industry of meat-, fish- and vegetable products.

It is also possible, according to another variant, to increase the fat content.

Examples of ingredients which can be incorporated according to the invention in the ultrafiltration retentate, are:
salt,
flavoring agents,
condiments,
sugar,
chocolate,
pieces of meat, fish, shellfish, offals, mushrooms, fruit, fresh or dry vegetables.

These various ingredients may be added separately or as a mixture. It is possible, by making judicious selections, to obtain salted terrines, more particularly intended to be eaten as appetizers or hors d'oeuvres, or sweet terrines, more particularly intended to be eaten as dessert. Such sweet terrines can advantageously be used as base materials in the pastry and confectionary industry.

Said ingredients only act as flavoring, texturing, garnishing, or similar agents, and do not react in any way with the constituents of the ultrafiltration retentate, and particularly with the natural proteins of the milk. For example, sugar, when added, acts only as a flavoring agent. The operational conditions of the method according to the invention are such that the MAILLARD effect does not occur; which MAILLARD effect intervenes in the preparation of "milk jam".

The said ingredients are baked during the heat treatment.

In a variant of the method according to the invention the ultrafiltration retentate, which may optionally contain ingredients of edible nature, is worked mechanically before and/or during and/or after the heat treatment. This mechanical working consists for example in a gas-induced swelling, the gas being air, nitrogen, etc. Lighter, mousse-type products are then obtained.

Said mousses may also contain meat, fish, fruit, vegetables, etc.

In other variants of the method according to the invention, it is possible to re-texture the final products obtained—heat-treated ultrafiltration retentates. It is also possible to prepare mixed terrines.

Such mixed terrines consist for example in multi-layered terrines, each layer having a specific texture, flavor or stuffing.

It is also possible to obtain mixed terrines by shaping finished products according to the invention, by extrusion and co-extrusion.

In conclusion, it is understood that the method according to the invention can be implemented in various ways and that it permits the preparation of a wide range of new food products.

It offers new outlets to the milk concentrates obtained by ultrafiltration.

The new products thus obtained constitute another object of the present invention. They are not cheeses or cheese dishes. They are based on ultrafiltration retentate from milk of animal origin, subjected to a heat treatment. The retentate, once thermo-coagulated, constitutes an edible dairy terrine, which may be advantageously flavored and stuffed.

It is worth noting that, according to the variant embodiments of the method according to the invention, it is possible to obtain more or less compact terrines, "pre-terrines", mixed terrines, mousses, . . . with or without stuffing.

The following examples of implementation of the method according to the invention are given solely by way of illustration and non-restrictively.

EXAMPLE OF PREPARATION OF A PARTLY DELACTOSED ULTRAFILTRATION RETENTATE

The milk is first pre-concentrated to a volume concentration factor (V.C.F.) of 4, and subjected in parallel to diafiltration.

The operation is conducted continuously as follows: the milk is treated on an ultrafiltration assembly composed of two modules each one of which is equipped with a centrifugal-type circulating pump. Between the two modules, there is a diafiltration assembly comprising a water supply tank and its circuit, and a control and adjustment system. On the first module, the milk is concentrated to a V.C.F. of 2.

At the inlet of the second module, just before the circulating pump, the diafiltration water is introduced in order to bring the retentate to the initial concentration of the milk (i.e. V.C.F.=1). Said retentate, thus re-diluted passes over the second module where it is concentrated to a V.C.F. of 4. Its composition, then, is:
total dry matter: 290 g/kg
total nitrogen matter: 125 g/kg
lactose: 18 g/kg This operation can, for example, be carried out on PASILAC modules equipped with GR 61 PP membranes (sold by the company PASILAC), or on Rhône-Poulenc modules equipped with Iris 3065 membranes, or on SFEC modules equipped with S 252 membranes (the last two types of modules being sold by the company TECHSEP).

The retentate, four times concentrated, is then subjected to a second ultrafiltration, known as finishing ultrafiltration, to a V.C.F. of 7.

The operation is conducted continuously on one or more modules equipped with a positive displacement vacuum type circulating pump.

The modules used are, for example, SFEC modules with S 151 membranes (sold by the company TECHSEP) or PASILAC modules with GR 61 PP membranes (sold by the company PASILAC).

The composition characteristics of the final products are:
total dry matter: 380 g/kg
total nitrogen matter: 190 g/kg
lactose: 12 g/kg

EXAMPLE 1

Cow's milk, standardized to 28 g/l of fat content is subjected to an ultrafiltration coupled with an operation of diafiltration, according to a process such as described hereinabove.

The composition of the ultrafiltration retentate obtained, is as follows:
total dry matter: 400 g/kg
total nitrogen matter: 200 g/kg
lactose: 12 g/kg
fat: 190 g/kg This retentate is acidified to a pH ranging between 6.3 and 6.5 by addition of lactic yeasts.

Then, the following ingredients are added to 1 kg of said retentate:
15 g of salt
20 g of smoked salmon natural flavoring
100 g of fine strips of smoked salmon
powdered spices The retentate and the aforesaid ingredients are mixed in a mechanical mixer at 40° C.

The resulting mixture is poured into a terrine such as used for pâtés. Thermocoagulation of the mixture (and baking of the ingredients) is carried out in an oven. The oven temperature is such that the core of the product reaches about 80°-85° C. The product is kept at that temperature for 2 to 5 hours, depending on the consistency wanted for the final product.

The product, after being allowed to cool down to room temperature, is kept in a refrigerator at a temperature of 4° C.

The product obtained is then comparable to a "meat pâté". It is meant to be clean as is, as starters, or cut into small dices for garnishing all types of mixed salads.

EXAMPLE 2

The base (or ultrafiltration retentate) used has the same composition as in Example 1.

Said base is divided into three parts:
the first part is kept at 40° C.
the second part is cooled down to 20° C.
the third part is cooled down to 4° C.

The following ingredients are added to the first part, for every kg of retentate:
15 g of salt
20 g of natural seafood flavoring
100 g of diced coral from scallops
spices
5 g of powdered tapioca.

The following ingredients are added to the second part, for every kg of retentate:
15 g of salt
20 g natural seafood flavoring
100 g of diced white meat from scallops
spices.

The following ingredients are added to the third part, for every kg of retentate:
15 g of salt
2 egg whites
150 g of finely diced carrots.

Then, in a terrine, are poured:
at the bottom, the part cooled down to 4° C.: carrot base,
then the part cooled to 20° C.: scallops white meat base,
and finally, the part kept at 40° C.: scallops coral base.

Thermocoagulation is carried out (and baking of the ingredients) in the same conditions as in Example 1.

A three-layered product is thus obtained, which is meant to be eaten mainly as a cold entrée.

EXAMPLE 3

Cow's milk standardized to a 19 g/l of fat content is subject to an ultrafiltration, coupled with a diafiltration operation, according to a process as described hereinabove.

The composition of the ultrafiltration retentate obtained is as follows:
 total dry matter: 370 g/kg
 total nitrogen matter: 180 g/kg
 lactose: 20 g/kg
 fat: 150 g/kg Its pH is adjusted to 6.30–6.40 by addition of lactic yeasts.

The retentate is gradually heated to 40° C.

Before heating, 1% of texturing agent (carragheen) is added. The mixture is then heated to 65° C. and the following ingredients are added for every kg of retentate:
 150 g of previously melted plain chocolate pieces
 10 g of chocolate flavoring
 8 g of nut flavoring
 100 g of sugar.

The temperature is brought to 75° C. and kept there for 50 minutes. At the end of heating, 30 g of powered nuts are added. The product is poured into jars and cooled down, first to 20° C. and then to 4° C.

A chocolate-flavor paste, rich in proteins is obtained.

EXAMPLE 4

Cow's milk standardized to 30 g/l fat content is subjected to ultrafiltration, coupled with a diafiltration operation according to the process described hereinabove.

The composition of the ultrafiltration retentate obtained is as follows:
 total dry matter : 350 g/kg
 total nitrogen matter: 150 g/kg
 lactose: 15 g/kg
 fat: 160 g/kg The base is slightly acidified to a pH of 6.60 by addition of lactic yeasts.

Then the following ingredients are added, for every kg of retentate:
 100 g of sugar
 20 of orange-passion fruits flavoring
 1 of salt The liquid mixture is poured into cans.

The cans are heated to 98° C. for 1 hour and 30 minutes to 3 hours depending on the consistency required for the final product.

A longer life flavored spreading paste is obtained which is meant to be eaten as is, or to be sold in large containers as ingredient for the pastry and confectionery industries.

EXAMPLE 5

Cow's milk standardized to a 20 g/l fat content is subjected to an ultrafiltration coupled with a partial delactosing treatment according to a process as described hereinabove.

The composition of the ultrafiltration retentate obtained is as follows:
 total dry matter: 420 g/kg
 total nitrogen matter: 210 g/kg
 lactose: 25 g/kg
 fat: 165 g/kg Said retentate is acidified up to pH of 6.50 by addition of lactic yeasts.

18 g of salt are added to 1 kg of said base.

The mixture is heated to 72° C. and kept at that temperature for 30 to 45 minutes, and then cooled down to 5° C.

A pasty product is then obtained.

Some mature Emmenthal type cheese in grated form is added to said pasty product.

The mixture is thereafter extruded to obtain individual patties in ball, cube, macaroon, stick, and other forms, for selling purposes. It is the consumer who will complete the thermocoagulation in a domestic oven.

When baked, the product swells and takes on the appearance of a croquette.

According to a variant, the patties may be filled: in this case, a stuffing is prepared in parallel to the pasty base described above, with the following ingredients:
 béchamel sauce
 diced lyophilized button mushrooms
 mushroom flavoring
 dry white wine The mixture of stuffing and pasty base is passed through a co-extruding machine, to obtain individual patties in ball, cube, macaroon, stick, and other forms, whose crust part is made up of the base, and whose inside part is made up of the stuffing. When baked, the product swells and takes on the aspect of a croquette.

What is claimed is:

1. A method of making a dairy-based food product which method consists essentially of the steps of:
 concentrating a milk of animal origin by ultrafiltration; and
 heat treating at a temperature in the range of about 60° C. to 100° C., the obtained ultrafiltration retentate which contains the natural proteins from the milk; such heat treatment ensuring at least partial coagulation of said retentate.

2. Method as claimed in claim 1, wherein said concentrating step includes selecting a fat content for said milk corresponding to a desired retentate fat content.

3. Method as claim in claim 1, wherein, by ultrafiltration, said milk of animal origin is concentrated at least twice in volume.

4. Method as claimed in claim 1, wherein the ultrafiltration retentate obtained in said concentrating step contains between 200 and 450 grams of dry matter per kilogram of ultrafiltration retentate.

5. Method as claimed in claim 1, wherein the pH of said ultrafiltration retentate has, before the heat-treatment, a value ranging between 6 and 7.

6. Method as claimed in claim 1, wherein the heat-treatment of said ultrafiltration retentate is carried out by continuous heating.

7. Method as claimed in claim 6, wherein heating of said ultrafiltration retentate is carried out in successive stages.

8. Method as claimed in claim 6, wherein heating of said ultrafiltration retentate is carried out for 1 to 8 hours.

9. Method as claimed in claim 1, wherein said ultrafiltration retentate is worked mechanically, before the heat-treatment.

10. Method as claimed in claim 3, wherein, by ultrafiltration, said milk of animal origin is concentrated between four and seven times in volume.

11. Method as claimed in claim 2, wherein the ultrafiltration retentate obtained contains between 200 and 450 grams of dry matter per kilogram of ultrafiltration retentate.

12. Method as claimed in claim 7 wherein said heating of said ultrafiltration retentate is carried out for 1 to 8 hours.

13. A method of making a diary-based food product which method consists essentially of the steps of:
concentrating a milk of animal origin by ultrafiltration; and
heat treating at a temperature in the range of about 60° C. to 100° C., the obtained ultrafiltration retentate which contains the natural proteins from the milk; such heat treatment ensuring at least partial coagulation of said retentate; and
adding at least one edible ingredient selected from the group consisting of food texturing agents, salt, flavoring agents, condiments, sugar, chocolate, pieces of meat, fish, shellfish, offal, mushrooms, fruit, fresh vegetables, dry vegetables, vegetable fibers, and fat substitutes, in said ultrafiltration retentate before said heat treatment; said ingredient being added so it does not affect or alter said thermocoagulation of said retentate.

14. A method of making a dairy-based food product which method consists essentially of the steps of:
concentrating a milk of animal origin by ultrafiltration; and
heat treating at a temperature in the range of about 60° C. to 100° C., the obtained ultrafiltration retentate which contains the natural proteins from the milk; such heat treatment ensuring at least partial coagulation of said retentate; and
adding at least one edible ingredient selected from the group consisting of food texturing agents, salt, flavoring agents, condiments, sugar, chocolate, pieces of meat, fish, shellfish, offal, mushrooms, fruit, fresh vegetables, dry vegetables, vegetable fibers, and fat substitutes, in said ultrafiltration retentate during said heat treatment; said ingredient being added so it does not affect or alter said thermocoagulation of said retentate.

15. A method of making a dairy-based food product which method consists essentially of the steps of:
concentrating a milk of animal origin by ultrafiltration; and
heat treating at a temperature in the range of about 60° C. to 100° C., the obtained ultrafiltration retentate which contains the natural proteins from the milk; such heat treatment ensuring at least partial coagulation of said retentate; and
adding at least one edible ingredient selected from the group consisting of food texturing agents, salt, flavoring agents, condiments, sugar, chocolate, pieces of meat, fish, shellfish, offal, mushrooms, fruit, fresh vegetables, dry vegetables, vegetable fibers, and fat substitutes, in said ultrafiltration retentate after said heat treatment; said ingredient being added so it does not affect or alter said thermocoagulation of said retentate.

16. The method of claim 1 wherein said ultrafiltration retentate is worked mechanically during the heat treatment.

17. The method of claim 1 wherein said ultrafiltration retentate is worked mechanically after the heat treatment.

18. Method as claimed in claim 4, wherein ultrafiltration retentate obtained in said concentrating step contains between 350 and 450 grams of dry matter per kilogram of ultrafiltration retentate.

19. Method as claimed in claim 5, wherein the pH of said ultrafiltration retentate has, before the heat-treatment, a value ranging between 6.3 and 6.7.

20. Method as claimed in claim 10, wherein, by ultrafiltration, said milk of animal origin is concentrated seven times in volume.

21. Method as claimed in claim 11, wherein the ultrafiltration retentate obtained contains between 350 and 450 grams of dry matter per kilogram of ultrafiltration retentate.

22. The method of claim 9 wherein said retentate is worked mechanically, by gas-induced swelling.

23. The method of claim 16 wherein said retentate is worked mechanically, by gas-induced swelling.

24. The method of claim 17 wherein said retentate is worked mechanically, by gas-induced swelling.

25. The method of claim 1 wherein the step of concentrating milk by ultrafiltration further includes a diafiltration.

* * * * *